Feb. 16, 1971  U. SCHMIDT  3,563,632

DIGITAL OPTICAL FOCAL LENGTH MODULATOR

Filed April 7, 1969

*INVENTOR.*
UWE SCHMIDT
BY
*Frank R. Trifari*
AGENT

3,563,632
DIGITAL OPTICAL FOCAL LENGTH MODULATOR
Uwe Schmidt, Pinneberg, Germany, assignor to U.S. Philips Corporation, New York, N.Y., a corporation of Delaware
Filed Apr. 7, 1969, Ser. No. 813,939
Claims priority, application Germany, Apr. 6, 1968,
P 17 64 132.6
Int. Cl. G02f *1/26*
U.S. Cl. 350—150   5 Claims

ABSTRACT OF THE DISCLOSURE

A digital optical focal length modulator where a number of aligned successive stages, each having a Kerr cell and a birefringent lens of progressively increasing curvature are immersed in a common electrolyte tank. Temperature compensation is achieved by making the sign of curvature of the strongest lens opposite to that of the other lenses in the modulator.

---

The invention relates to a digital focal length modulator having a plurality of stages which are arranged one behind the other and each comprise a controllable electrooptical polarizer and a birefringent lens.

Such a modulator is known, see e.g. U. J. Schmidt "The Problem of Light Beam Deflection at High Frequencies" in "Optical Processing of Information," pages 98–103, Sparta Books, Baltimore, 1963. In the known modulator a light beam is passed through a sequence of electrooptical polarizers alternating with lenses made of birefringent materials. By applying suitable electric voltages to the polarizers the angular aperture of the light beam may be changed in digital steps, the changes being solely determined by the geometry of the birefringent lenses and by the values of the refractive indices of the birefringent material and of the surrounding medium. The code of the voltages to be applied to the polarizers is binary.

In practice, Kerr cells containing nitrobenzene have proved suitable polarizers. When such cells are used, the birefringent lenses and the Kerr cell electrodes are advantageously accommodated in a common electrolyte tank. Thus, reflections which occur at the lens surface are automatically reduced to a very small value (0.1%). However, this has the disadvantage that the strong temperature dependence of the refractive index of nitrobenzene gives rise to variation of the aperture of the light beam with temperature.

It is an object of the invention to obviate this disadvantage. For this purpose, the invention is characterized in that the birefringent lens having the greatest curvature has a sign of the curvature opposite to that of the remaining birefringent lenses.

The invention is based on the recognition that the use of birefringent single lenses of a special shape enables the locations of the foci to be stabilized in the case of temperature variations, irrespective of the medium surrounding the lenses.

Features and advantages of the invention will appear from the following description of embodiments thereof, given by way of example only, with reference to the accompanying drawings, in which:

FIGS. 1 to 5 show schematically embodiments of a modulator according to the invention.

Figure 1:
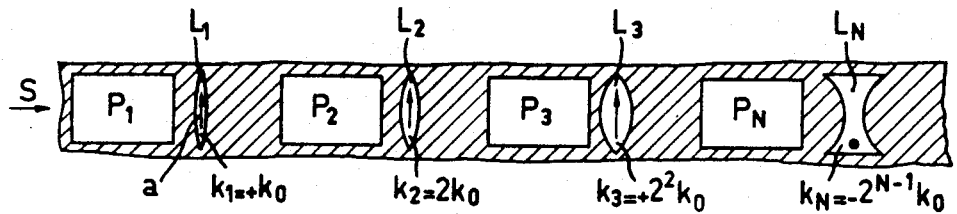

Referring to FIG. 1, there is shown schematically a digital focal length modulator comprising a sequence of $(N-1)$ polarizers $P_1 \ldots P_{N-1}$ adapted to be switched and alternating with $(N-1)$ birefringent convex lenses $L_1 \ldots L_{N-1}$ having suitably oriented optic axes $a$, a further polarizer $P_N$ and a birefringent concave lens $L_N$. The effective curvatures $k_1 \ldots k_{N-1}$ of the convex lenses increase by a factor of two in the direction of propagation, of the light beam S passing through the focal length modulator. The term "effective curvature" is to be understood herein to mean the reciprocal of the sum of the radii of curvature of the active lens surfaces. The effective curvature of the concave lens $L_N$ is twice that of the convex lens having the greatest effective curvature but is of opposite sign.

Figure 2:
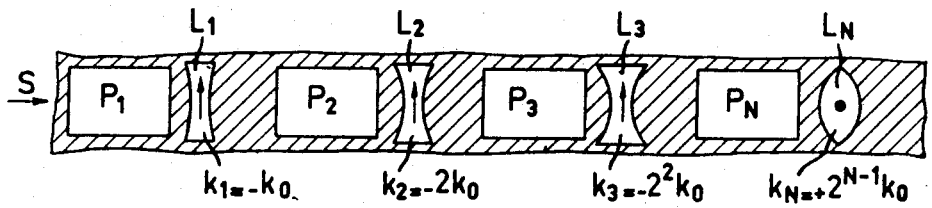
Figure 3:
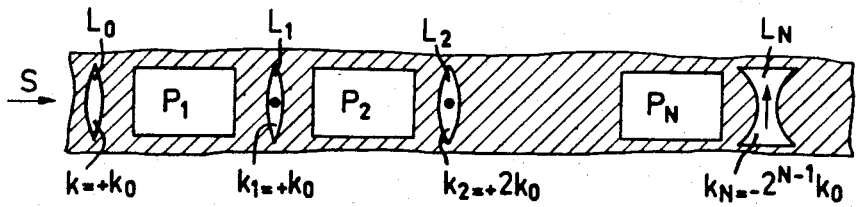

In the embodiment shown in FIG. 2, the concave lenses have been replaced by convex lenses (and conversely). Both in the arrangement shown in FIG. 1 and in that shown in FIG. 2 the aperture of a beam passing through the focal length modulator is influenced in each stage not only by the birefringent lens but also by the refractive index of the surrounding isotropic medium. This influence of the medium may be represented by considering the surrounding medium as a lens having a shape which is complementary to that of the birefringent lens. The first $(N-1)$ complementary lenses have a sign of the focal length opposite to that of the $N^{th}$ lens. The total refractive power of all N complementary lenses is equal to that of the lens of the stage having the smallest refractive power but is of opposite sign. Consequently, the surrounding medium determines the temperature dependence of the angular aperture of the beam solely by means of the temperature dependence of the said lens having the smallest refractive power. Thus, in a focal length modulator which comprises, for example, ten stages this temperature dependence is smaller by a factor of $2^{10} \approx 1000$ than in a modulator of the usual design in which all the birefringent lenses have the same sign of the curvature.

An even further improved stabilisation of the locations of the foci of the focal length modulator is obtainable by the additional inclusion in the system of an isotropic lens $L_0$ (FIG. 3) the effective curvature of which is equal to that of the lowest-power birefringent lens $L_1$ and the refractive index of which is equal to the mean refractive index of the birefringent material as far as possible at all the temperatures to be expected. Even if the second condition, i.e. the equality of the isotropic refractive index and the means refractive index of the birefringent lens, can only be approximately satisfied owing to the restricted number of available optical materials, the residual change of location of the foci due to the temperature in practice will usually be negligible.

Figure 4:
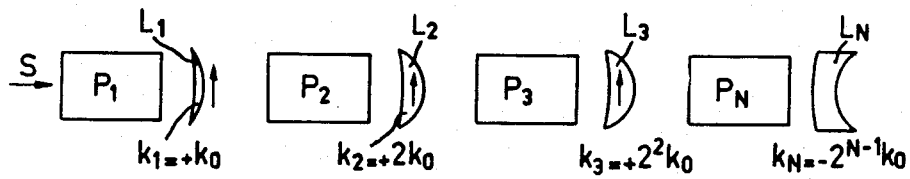

A further modified embodiment of the invention is shown in FIG. 4. In the focal length modulator shown schematically in this figure, the two faces of a birefringent lens $L_1 \ldots L_N$ do not have the same sign of the curvature. Although only the effective curvature of the birefringent lenses determines the locations of the foci, the distribution of the curvature between the front and rear faces of the birefringent lenses influences the position of the image of the beam passing through the modulator. Which of the possible distributions of the curvatures is of advantage depends upon the boundary conditions of the system, for example, upon the angle contained by the beam entering the focal length modulator and the system axis. The optimum distribution can be determined according to the known laws of geometrical optics, see for example J. Flügge "Leitfaden der geometrischen Optik and des Optikrechnens," Vandenhoeck and Ruprecht, Göttingen 1956, and P. Chmela: "Strahlenverlauf in einem System aus doppelbrechenden Linsen," Optik 26, Seiten 254–263 (1968).

The above considerations apply only in so far as the thin-lens laws apply to the said isotropic complementary lenses. This will generally be the case in the first stages of a focal length modulator. The use of the invention in the last stages of a focal length modulator, where the thin-lens laws do not apply, as a rule is not necessary because in these stages combinations of birefringent lenses will in any case be used in order to reduce, for example, aberrations due to the double refraction and spherical aberrations. In these stages in each individual case care must be taken to ensure that the isotropic complementary lenses of the surrounding medium together give a negligible effective curvature.

Figure 5:
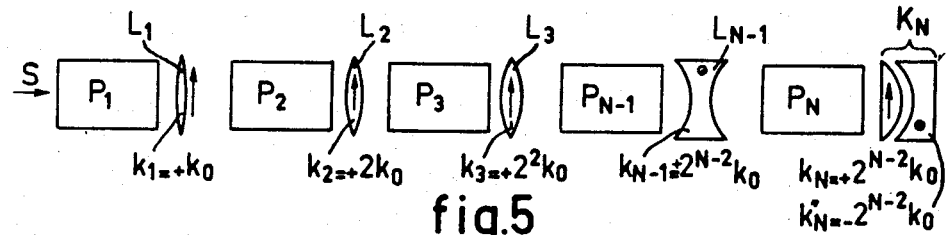

FIG. 5 shows schematically a focal length modulator, the first stages of which have been designed in accordance with the invention, the last stage consisting of a combination $K_N$ of two birefringent lenses having a negligibly small effective curvature of the complementary lens owing to the fact that the curvature $k'_N$ and $k''_N$ are equal but opposite.

Possible uses of the invention are not restricted to the above-described example of the use of nitrobenzene as the medium surrounding the birefringent elements. The same considerations and rules apply to other isotropic materials.

What is claimed is:

1. A digital focal length modulator assembly for use with a radiation beam and comprising a plurality of stages arranged one behind the other, substantially all of said stages comprising a controllable electro-optical modulator and a birefringent lens with the same sign of curvature, the lens in each succeeding stage having a curvature larger than that of a lens in a preceding stage, the assembly further comprising an additional stage aligned with the other stages and comprising a controllable electro-optical modulator and a birefringent lens having a greater curvature then the other lenses and having a sign of curvature opposite to that of the remaining birefringent lenses.

2. A digital focal length modulator as claimed in claim 1, wherein the modulator and lens of each stage is surrounded by a medium, and wherein the sum of the curvatures of the refractive surfaces of the medium surrounding the polarizers and the birefringent lenses is approximately equal to zero.

3. A digital focal length modulator as claimed in claim 2, wherein an isotropic lens having a curvature equal to that of the birefringent lens having the smallest power is arranged in the path of the beam, and wherein the refractive index of the isotropic lens is substantially equal to the mean refractive index of the birefringent material at all the temperatures to be expected.

4. A digital focal length modulator as claimed in claim 1, wherein an isotropic lens having a curvature equal to that of the birefringent lens having the smallest power is arranged in the path of the beam, and wherein the refractive index of this isotropic lens is substantially equal to the mean refractive index of the birefringent material at all the temperatures to be expected.

5. A digital focal length modulator as claimed in claim 1, wherein the last stage comprises a combination of birefringent lenses which has a negligibly small effective curvature.

References Cited
UNITED STATES PATENTS

| | | | |
|---|---|---|---|
| 3,410,624 | 11/1968 | Schmidt | 350—175X |
| 3,432,238 | 3/1969 | Girard | 350—179X |

JOHN K. CORBIN, Primary Examiner

U.S. Cl. X.R.

350—160, 175, 179